United States Patent
Tofaili et al.

(10) Patent No.: US 11,484,151 B2
(45) Date of Patent: Nov. 1, 2022

(54) TOASTER SENSING DEVICE

(71) Applicant: BREVILLE PTY LIMITED, Alexandria (AU)

(72) Inventors: Ali Tofaili, Alexandria (AU); Gerard Andrew White, Alexandria (AU); Con Psarologos, Alexandria (AU); Sathia Thangamuthu, Alexandria (AU); Alastair Dover, Alexandria (AU); Tristan Brega, Alexandria (AU)

(73) Assignee: Breville Pty Limited, Alexandria (AU)

( * ) Notice: Subject to any disclaimer, the term of this patent is extended or adjusted under 35 U.S.C. 154(b) by 255 days.

(21) Appl. No.: 16/337,376

(22) PCT Filed: Dec. 15, 2017

(86) PCT No.: PCT/AU2017/000280
§ 371 (c)(1),
(2) Date: Mar. 27, 2019

(87) PCT Pub. No.: WO2018/107206
PCT Pub. Date: Jun. 21, 2018

(65) Prior Publication Data
US 2020/0029735 A1   Jan. 30, 2020

(30) Foreign Application Priority Data
Dec. 15, 2016   (AU) .............................. 2016905196

(51) Int. Cl.
*A47J 37/08*    (2006.01)
*G01N 21/27*   (2006.01)
*G02B 5/08*    (2006.01)

(52) U.S. Cl.
CPC ......... *A47J 37/085* (2013.01); *A47J 37/0807* (2013.01); *G01N 21/27* (2013.01); *G02B 5/08* (2013.01)

(58) Field of Classification Search
CPC ...... A47J 37/08; A47J 37/0807; A47J 37/085; A47J 37/0871; G01N 21/251; G01N 21/27; G02B 5/08
(Continued)

(56) References Cited

U.S. PATENT DOCUMENTS 3,956,978 A    5/1976  Borley
4,913,046 A    4/1990  Mothrath et al.
(Continued)

FOREIGN PATENT DOCUMENTS

DE    3424585 A1    2/1985
EP    0033642 A2    8/1981
(Continued)

OTHER PUBLICATIONS

International Search Report and Written Opinion for PCT/AU2017/000280, dated Feb. 27, 2018.
(Continued)

*Primary Examiner* — Hung D Nguyen
(74) *Attorney, Agent, or Firm* — Moser Taboada

(57) ABSTRACT

A toaster (103) having a side wall (10) with a reflective surface (16) to reflect radiant heat towards a toasting chamber (13), and an external surface to which there is attached a sensor assembly (12). The sensor assembly (12) provides a source beam to illuminate part of the product and receives a reflected beam that is received by a sensor, with the sensor providing a signal indicative of a property of the reflected beam and therefore a chromatic property of the product.

16 Claims, 16 Drawing Sheets

(58) Field of Classification Search
USPC .......................... 99/385, 388, 392, 395, 401
See application file for complete search history.

(56) References Cited

U.S. PATENT DOCUMENTS

| | | | | |
|---|---|---|---|---|
| 6,730,888 B1 * | 5/2004 | Battu | .................... | A47J 37/085 |
| | | | | 99/385 |
| 2004/0206248 A1 * | 10/2004 | Lawson | ................. | G01N 21/27 |
| | | | | 99/388 |
| 2008/0279998 A1 * | 11/2008 | Park | ...................... | A47J 37/085 |
| | | | | 426/466 |
| 2010/0151103 A1 | 6/2010 | Douglas et al. | | |
| 2015/0185138 A1 * | 7/2015 | Richardson | .......... | G01N 21/251 |
| | | | | 356/402 |
| 2016/0278576 A1 * | 9/2016 | Manning | ............. | A47J 37/0871 |

FOREIGN PATENT DOCUMENTS

| | | |
|---|---|---|
| EP | 1 504 665 A1 | 2/2005 |
| RU | 2012115465 A | 10/2013 |
| WO | WO-99/056600 A1 | 11/1999 |
| WO | WO-02/060302 A2 | 8/2002 |
| WO | WO-2003/011090 A1 | 2/2003 |

OTHER PUBLICATIONS

Extended European Search Report issued in European Patent Application No. 17881532.0, dated May 8, 2020.
Office Action and Search Report issued in Russian Patent Applicationi No. 2019107933, dated Apr. 12, 2021.
Communication Pursuant to Article 94(3) EPC issued in European Patent Application No. 17 881 532.0, dated Jan. 19, 2022.

* cited by examiner

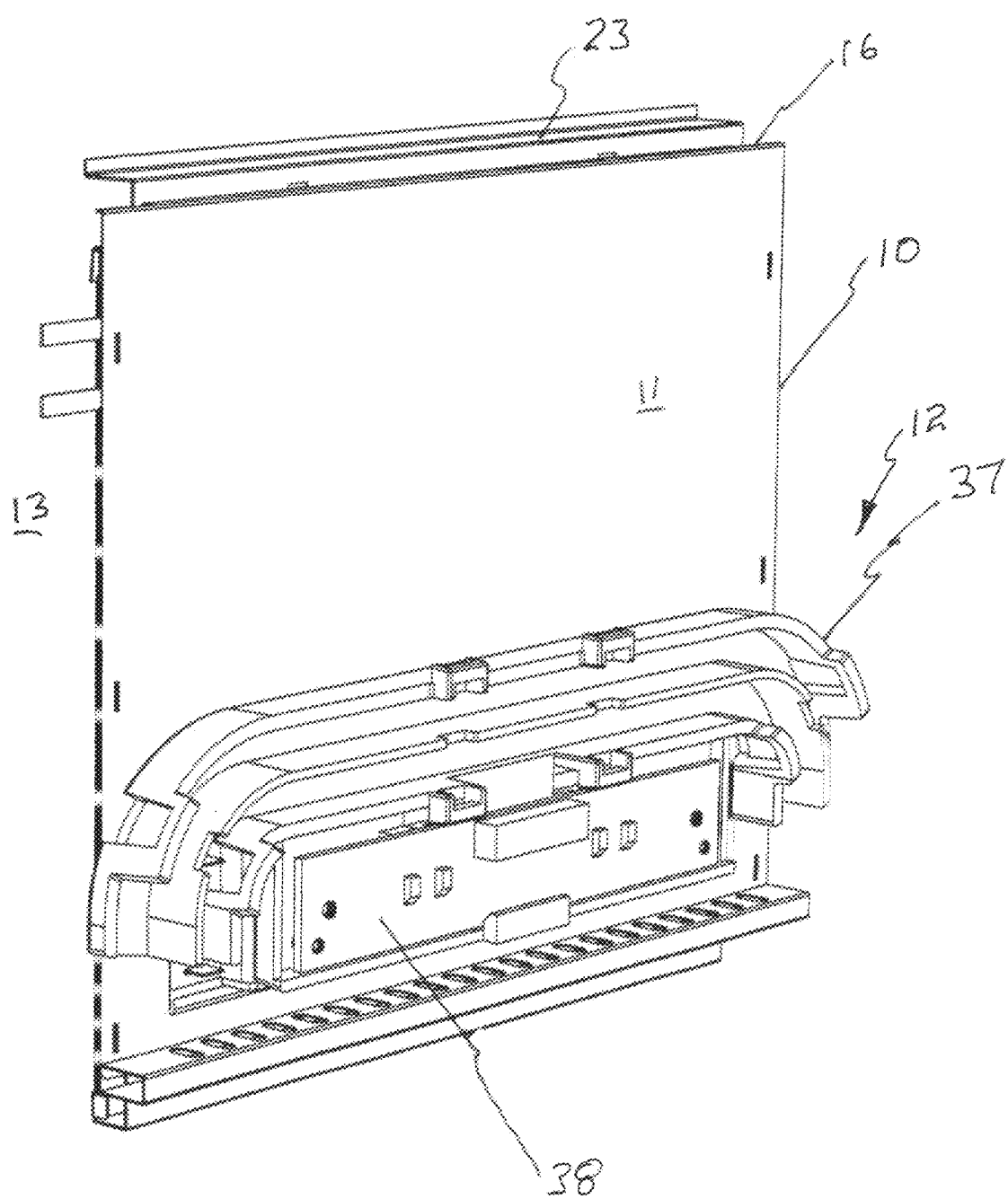

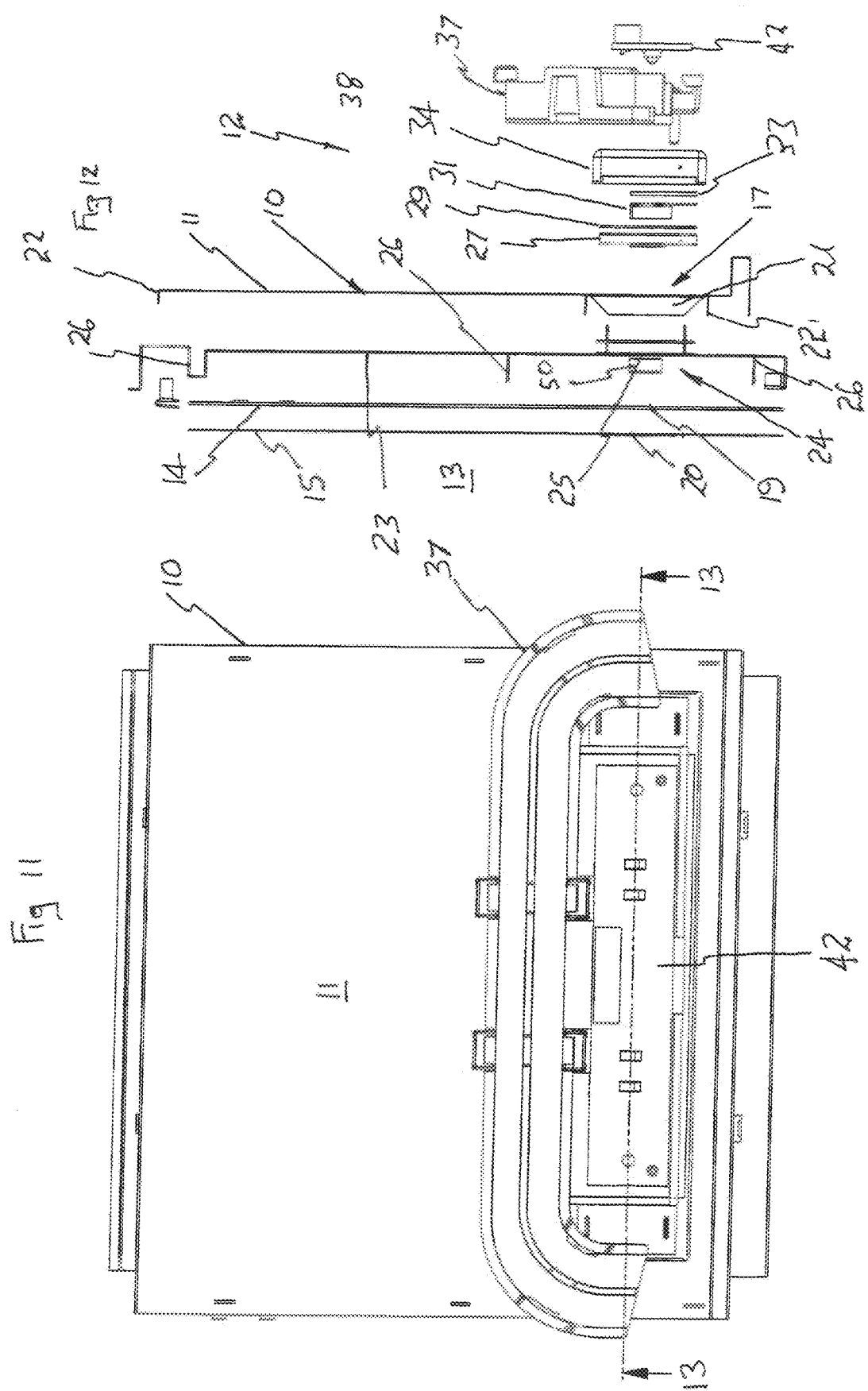

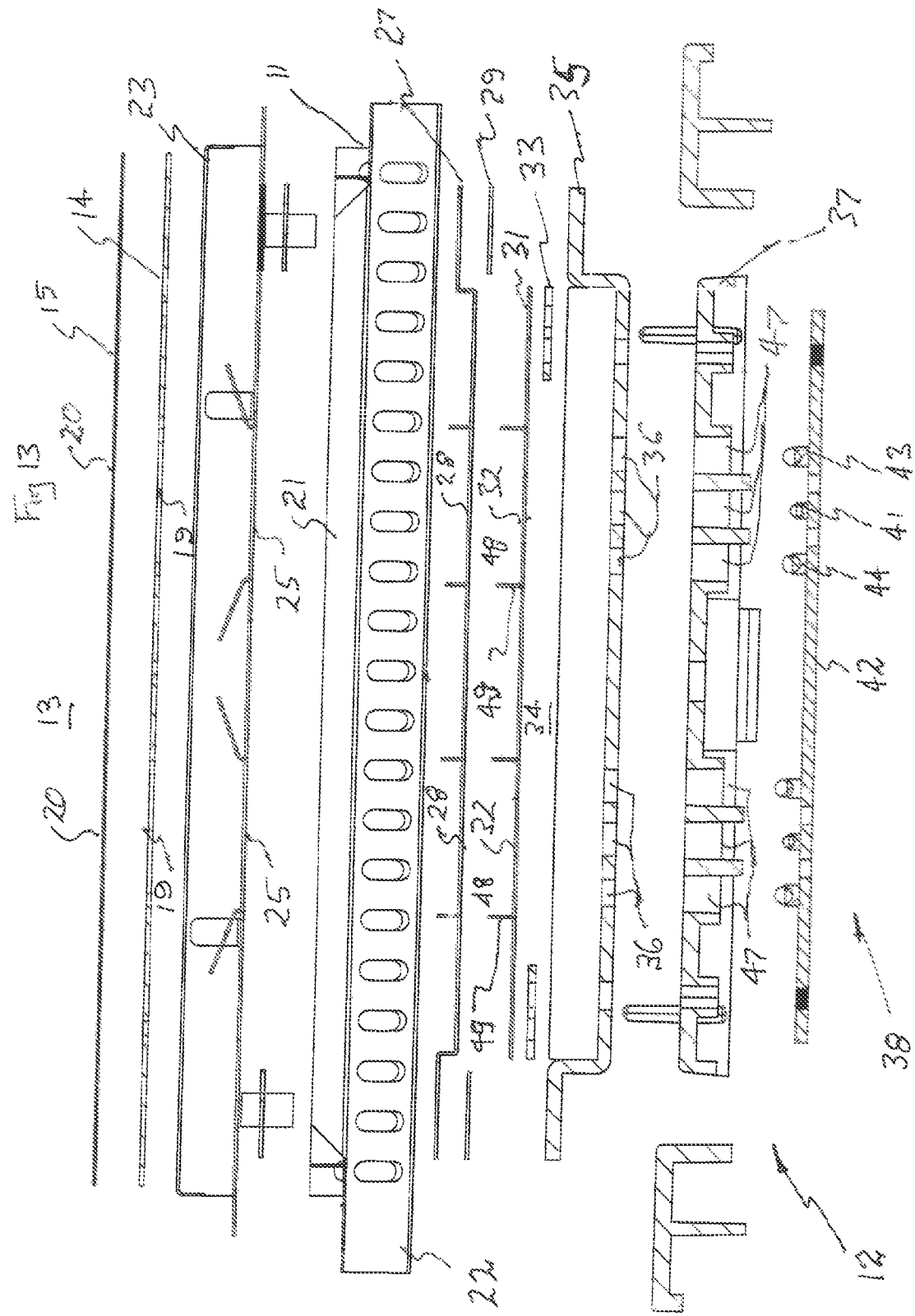

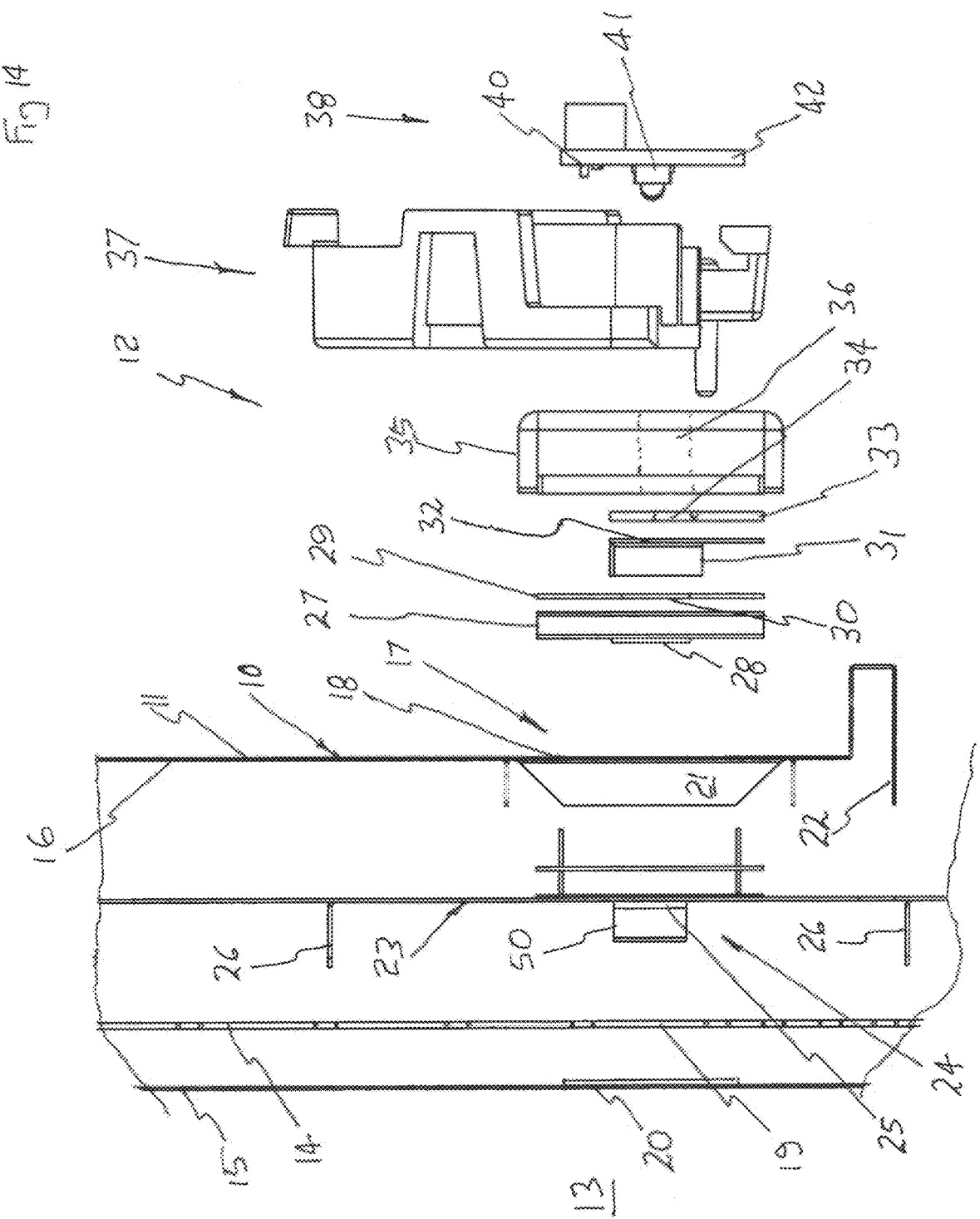

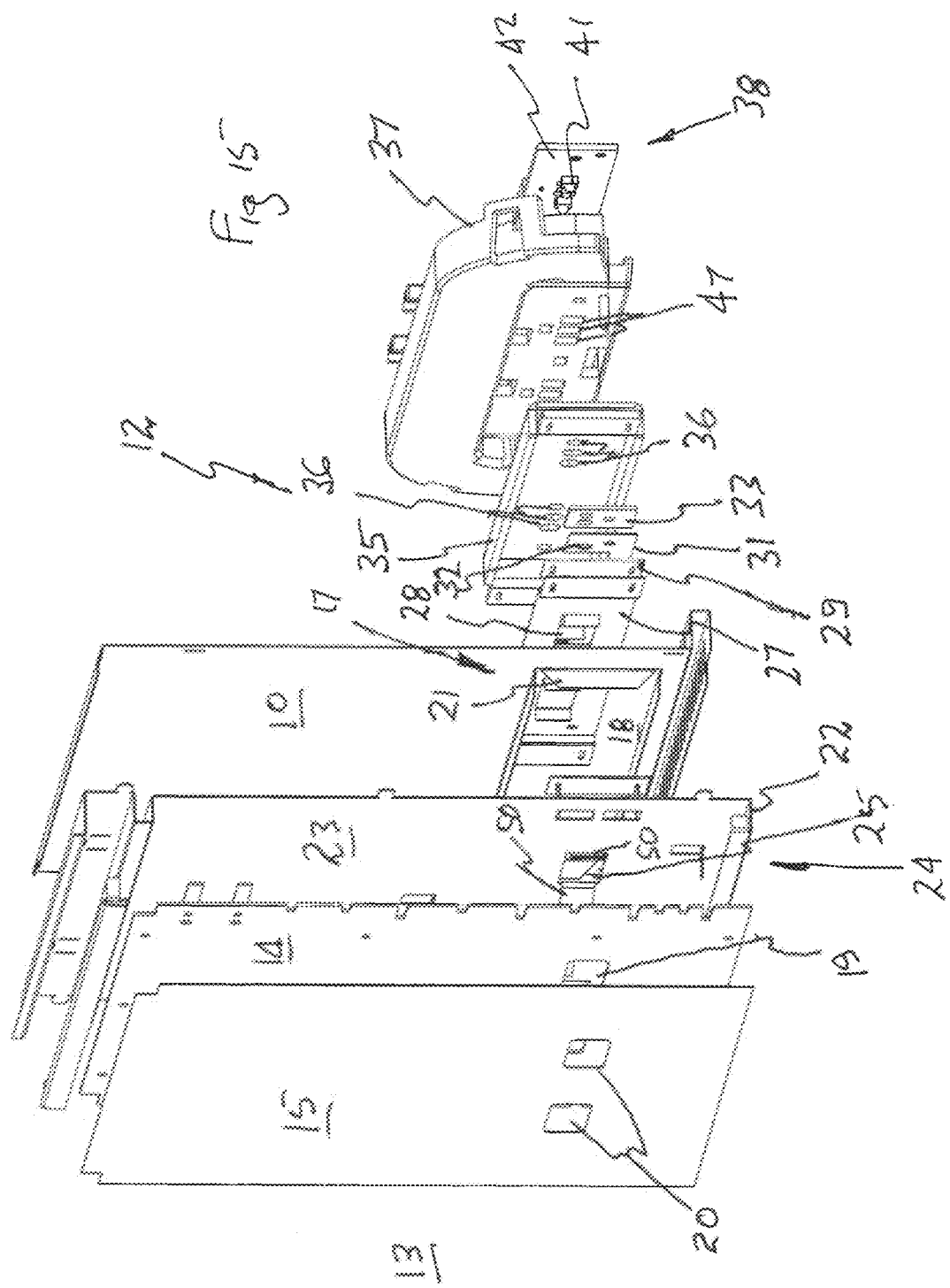

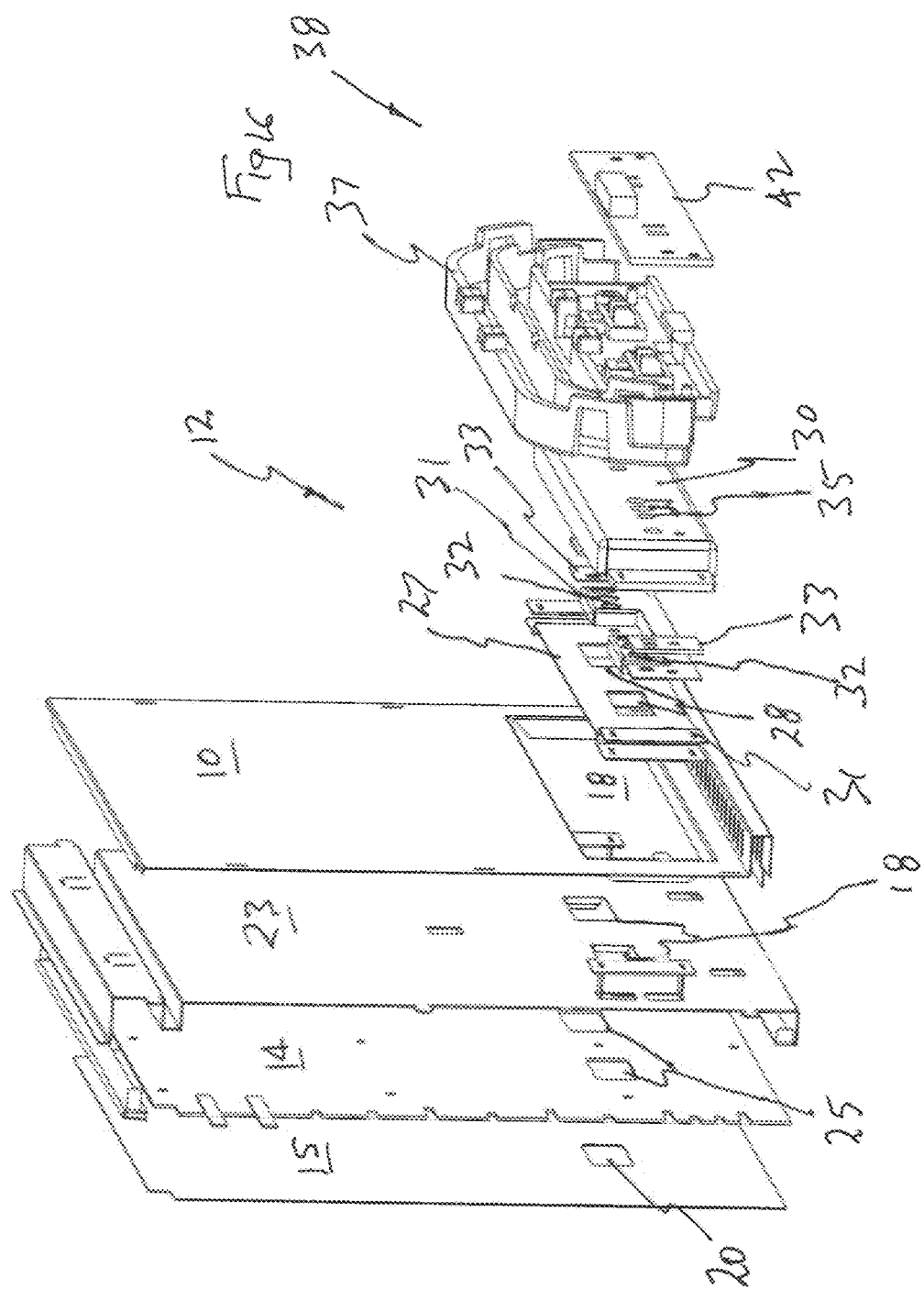

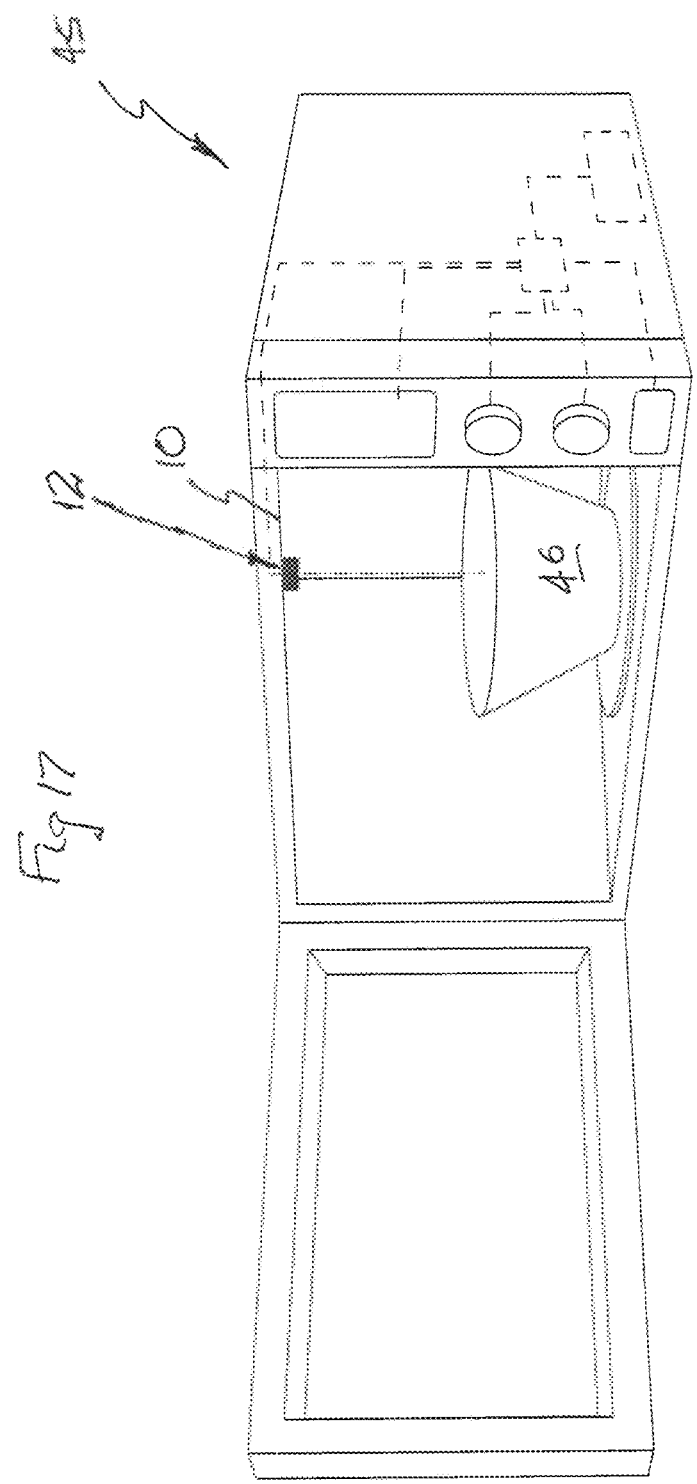

TOASTER SENSING DEVICE

FIELD

The invention relates to toasters and more particularly to the sensing of the characteristics of foods being toasted, while they are in the toaster.

BACKGROUND OF THE TECHNOLOGY

The performance of electronic components such as LEDs is significantly impacted by external operating conditions, i.e. moisture and temperature. In toasters, the heat that is radiated during a toasting cycle will result in higher operating temperature within certain internal zones of the toaster assembly. Typical examples of zones with higher operating temperatures are areas bordering the heating element assembly, areas lateral to the heating element assembly and areas above and below the heating element assembly.

Consequently, any electronic components, particularly sensing components, positioned in these zones may be affected. Examples of this are the variations in the performance characteristics of components caused by the change in mobility of electrons when operated at higher temperatures. In the case of LED's, the intensity of light being illuminated can vary when operated at higher temperatures compared to ambient temperatures. This is a concern with existing toasting and cooking appliances incorporating a device with LED's/detectors to measure chromatic property of foodstuff such as sliced bread. Variances to the intensity of light will result in incorrect chromatic measurements resulting in under toasting or even burning of toasted bread.

Chromatic measurement devices are used in existing toasting and cooking appliances. They are typically placed in locations to enable direct line of sight access to surfaces of foodstuff. It is a disadvantage of this arrangement that the device is positioned in close proximately to the appliance's heating elements or even in areas subjected to direct radiated heat or in the path of heat convection. This in turn results in the device's electronic components operating in unfavourable temperature conditions.

In order to compensate for the variance in LED light intensity, the same device may also incorporate a sensor for measuring temperature. This temperature measurement may be used to normalise the light values measured by the device's detector so as to correct heat influenced variances, thus, optimising chromatic measurements. However, this method has the disadvantage that the method requires performance testing to be conducted on the device's LED's across a range of temperatures using an acceptable amount of LED's acquired from each production batch. In summary, this method requires continuing testing of the LED's performance which is then used to update the device's software so as to normalise the measured light.

To eliminate the necessity of conducting continuous LED performance testing in order to normalise the measured light, the chromatic measurement device needs to be positioned in an internal zone which is less affected by heat. However, this has the disadvantage that many locations do not easily allow direct line of sight access to the surfaces of the foodstuff that is required to be measured, due to appliance internal parts and structures obstructing in the devices LED illumination path.

OBJECT OF THE INVENTION

It is the object of the present invention to overcome or substantially ameliorate at least one of the above disadvantages.

SUMMARY OF THE INVENTION

There is disclosed herein a sensor assembly for installation in an appliance to detect a chromatic property of a product that is to be heated in the appliance, the appliance having a chamber to receive the product, the chamber having a wall with an apertured portion through which the product can be exposed, the assembly including:

a reflector having a reflector surface, the reflector having a wall portion through which light can pass, to be aligned with the wall apertured portion; and a sensor device fixed with respect to the reflector so that the reflector is to be positioned between the wall and the sensor device, the sensor device including a light source to produce a source light beam directed at the wall portion so as to illuminate a portion of the product so as to produce a reflected beam, a light sensor fixed with respect to the light source and aligned with the wall portion so as to receive the reflected beam and provide a signal indicative of a property of the reflected beam and therefore the chromatic property of the product.

Preferably, the reflector is located so that the wall is located between the reflector and the light sensor.

Preferably, the reflector is a first reflector and the assembly includes a second reflector, the second reflector being located between the wall and the sensor device.

Preferably, the sensor assembly includes a heat sink located between the wall and sensor device, the heat sink providing for passage of the source light beam and reflect beam thereby.

Preferably, a heat insulator is located between the second reflector and heat sink.

Preferably, a third heat shield is located between the insulator and the heat sink.

Preferably, the heat sink is firmly connected to at least portion of the sensor device to at least aid in stabilising the temperature of at least portion of the sensor device.

Preferably, at least one of the shields includes projections that provide passages through which air passes to cool the sensor assembly.

Preferably, the wall portion is at least one aperture.

Preferably, the wall includes reflectors that at least aid in reflecting radiant energy back towards portions of the product aligned with the apertures.

There is further disclosed herein a toaster having the above wall and sensor assembly of claim 8.

Preferably, the wall is vertically oriented.

There is further disclosed herein an appliance to receive a product or heat the product, the appliance having:

a chamber to receive the product;

a heater to heat the chamber and therefore the product contained therein;

at least one side wall at least partly defining the chamber, the side wall having a wall portion through which light can pass;

a sensor device fixed with respect to the side wall, the sensor device including a light source to produce a source light beam to illuminate a portion of the product so as to produce a reflected beam, a light sensor fixed with respect to the light source and positioned so as to receive the reflected beam and provide a signal indicative of a property of the reflected beam and therefore the chromatic property of the product; and a reflector to intercept the source beam and reflected beam so that the source beam is directed at the product, and the reflected beam is directed at the light sensor.

Preferably, the wall portion is an aperture.

Preferably, the reflector is movable so that the light source engages a further portion of the product.

Preferably, a lens intercepts the source beam and reflected beam.

BRIEF DESCRIPTION OF THE DRAWING FIGURES

Preferred forms of the present invention will now be described by way of example with reference to the accompanying drawings wherein:

FIG. 10 is a schematic isometric view of a wall of an appliance within which a product is heated, with a sensor assembly mounted on the wall;

FIG. 11 is a schematic elevation of the appliance of FIG. 10;

FIG. 12 is a schematic side parts exploded elevation of the wall and sensor assembly of FIG. 11;

FIG. 13 is a schematic plan view of the wall and assembly as shown in FIG. 11, sectioned along the line 13-13;

FIG. 14 is a schematic enlarged parts exploded plan view of portion of the wall and sensor assembly as shown in FIG. 12;

FIG. 15 is a schematic parts exploded isometric view of the appliance wall and sensor assembly of FIG. 10;

FIG. 16 is a further isometric parts exploded view of the appliance wall and sensor assembly of FIG. 10; and FIG. 17 is a schematic perspective view of an oven, incorporating the wall and sensor assembly of FIG. 10.

BEST MODE AND OTHER EMBODIMENTS OF THE TECHNOLOGY

In order to improve the performance of electronic sensing components and to eliminate or minimise sensor data normalisation, they may be relocated to cooler zones within a toaster. Cooler zones within the toaster are less affected by heat and therefore improve the performance of sensing components.

Figure 1:
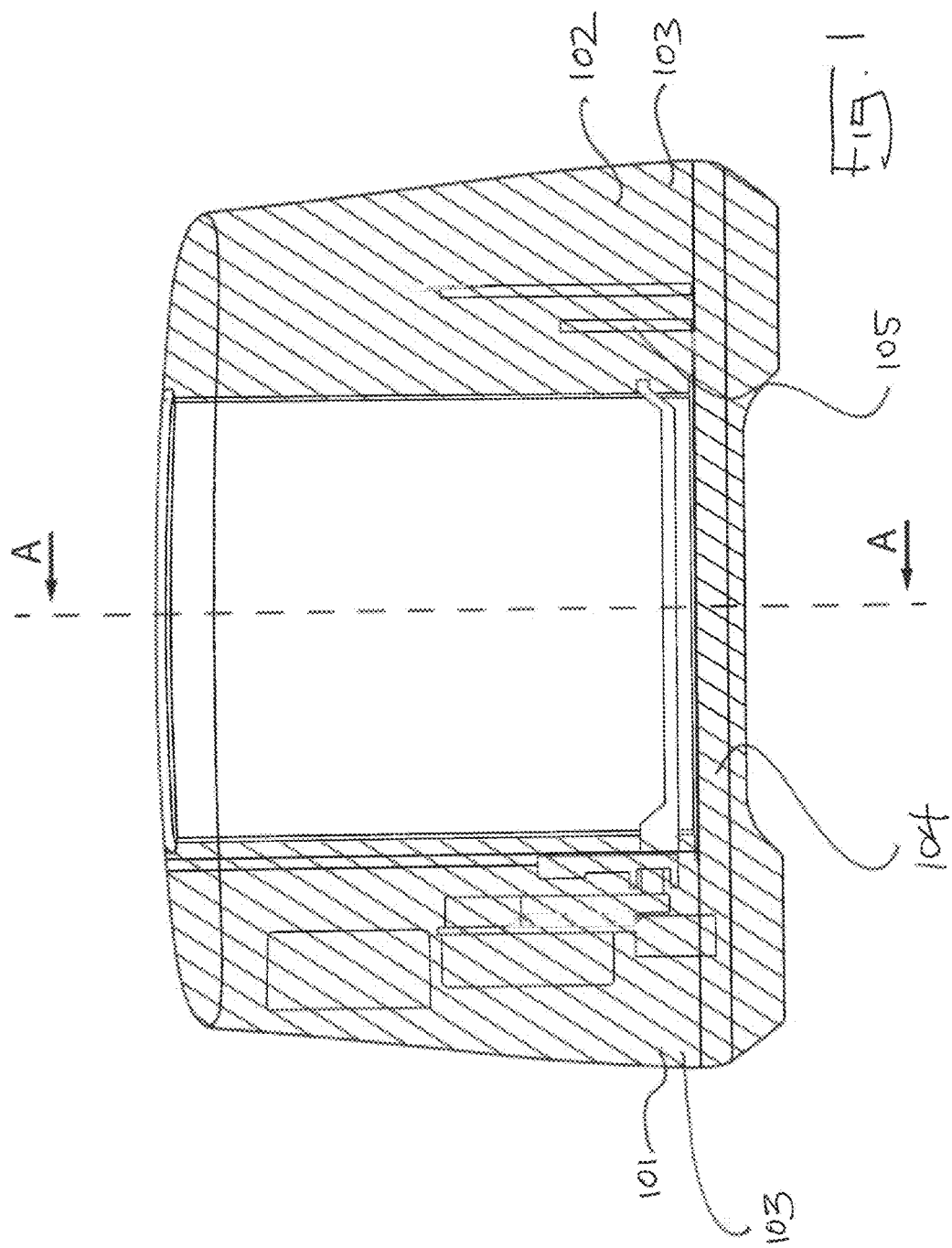
FIG. 1 is a schematic side elevation of a toaster.

As shown in FIG. 1, typical examples of these zones are areas that do not border or are not lateral to any heating element assembly such as the opposite ends of the toaster 101, 102, the corner areas of the toaster 103 and zones positioned away from radiated heat such as areas below the heating element assembly chassis 104, i.e. a base/floor assembly. As a result, the performance of electronic components when positioned in these cool zones is within satisfactory and optimized temperature conditions. Measurements taken by the sensors may be used by the device's processor 105 to determine food toasting extent, colour, temperature and other parameters from which a toasting time or heating element performance may be determined or adjusted.

Figure 2:
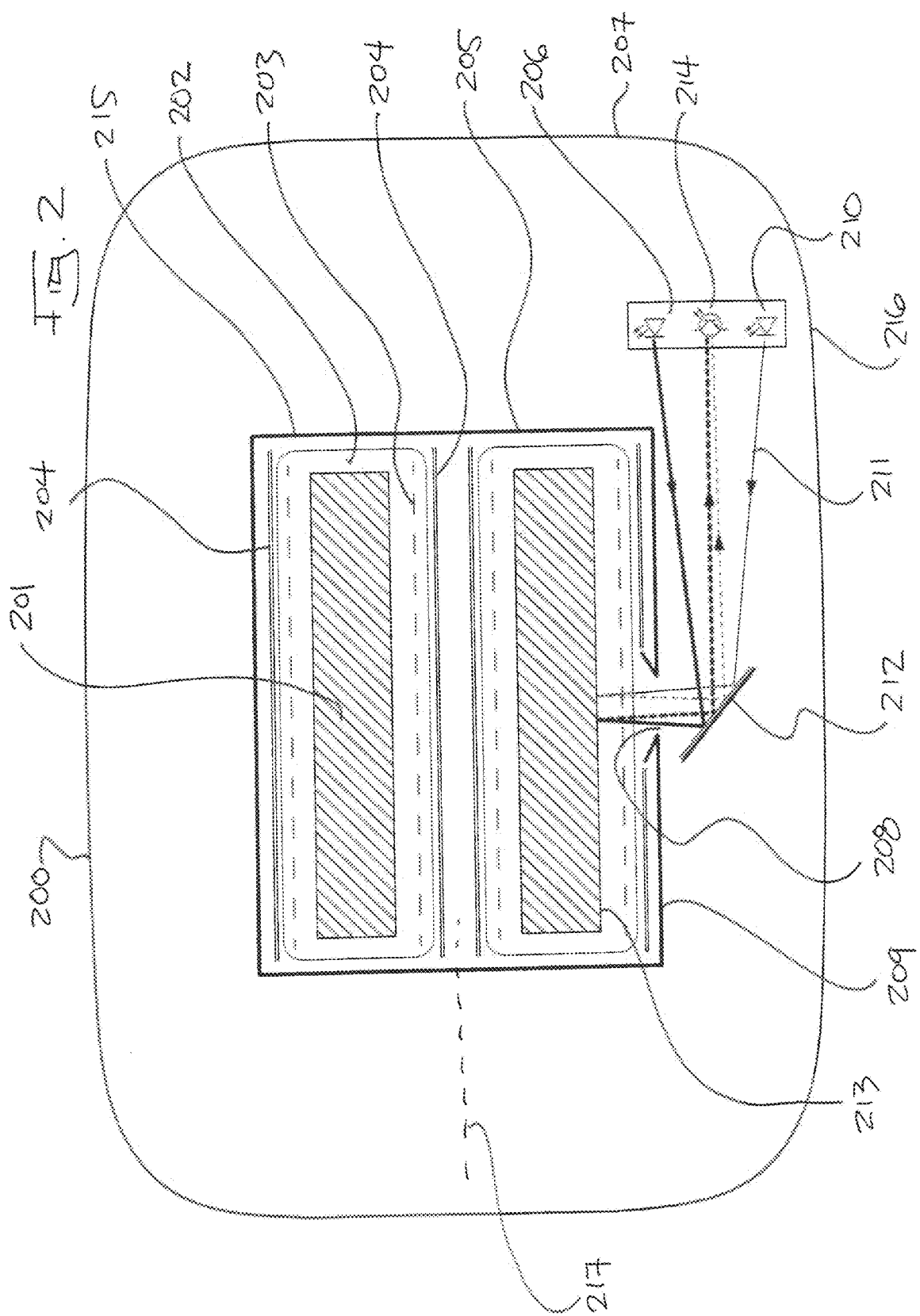
FIG. 2 is a top plan view of a toaster having a mirror and sensing assembly.

As shown in FIG. 2, in the example of a two slice toaster 200 as shown in FIG. 2, bread or other food 201 is contained within one or more toasting cavities 202. Each cavity is typically provided with fixed or removable toast guides 203. The toasting cavity is located between a pair of heating element cards 204. Such cards are typically fabricated from a sheet of mica or other heat stable material around which a heating element is wrapped. In this example, the two toasting cavities are surrounded by a metallic chassis 205. In order to allow a sensing assembly 206 to be located outside of the chassis 205, but still within the toaster's housing 207, an opening 208 is provided in one of the lateral sidewalls 209 of the chassis 205. The sensor assembly 206 comprises one or more light emitting diodes 210. The diodes 210 emit light 211 toward a mirror or reflector 212. The mirror or reflector (together, "mirror" herein) is located external to the chassis 205 but within the housing 207. Light 211 from the LED 210 strikes the mirror 212 and is directed through the opening 208 such that it impinges on a surface 213 of the food 201. The light from the LED is reflected by the surface 213 such that it impinges on the mirror 212 and is thereby reflected or directed toward a sensor 214 preferably located on the sensor assembly 206. In this example, the sensor assembly is located axially beyond the axial end surface 215 of the chassis 205 and closer to the lateral side 216 of the housing than to the axial centre line 217 of the toaster.

It is known that when light is emitted from a source it appears to diverge; an example of this is when light is emitted from an LED. In turn, over distance, this divergence results in attenuation in the light intensity. This becomes a concern when the actual source of light is being used for measurement or sensing purposes. A reduction in the intensity of light contributes to a reduction in the signal to noise ratio and consequently incorrect or noisy data being measured.

Figure 3:
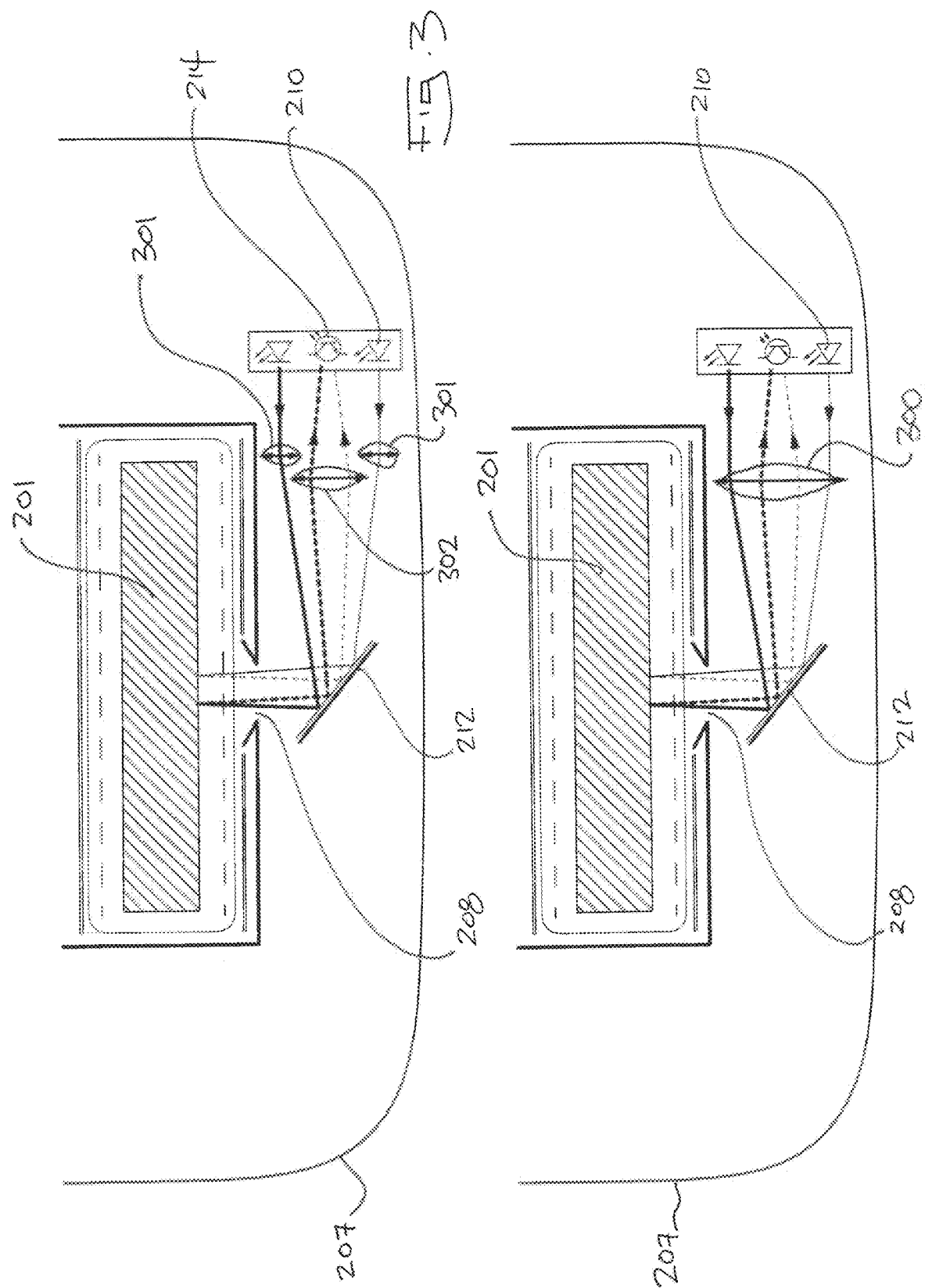
FIG. 3 illustrates the use of lenses in a sensing assembly within a toaster.

As shown FIG. 3, one lens 300 or multiple concave or convex lenses 301 converge or diverge the light from its source. With a convex lens more constant propagation of light is maintained over the required distance with minimal affect to its intensity and thus ensuring a higher signal to noise ratio.

By adding one or more optional lenses this attenuation/reduction in light intensity is eliminated as the light appears to converge from its source. Using concave lenses allow a greater area to be scanned.

A lens 302 may also be used to focus or converge light toward the detector or sensor 214.

A fixed mirror 212 has functional limitations. It restricts the amount of surface that is measured on an actual foodstuff to a single location when used in conjunction with a single chromatic measurement device. This could reduce the sensing effectiveness when measuring a foodstuff having on its surface, seeds, nuts, raisins or other items that may influence the chromatic result of a foodstuff during the toasting cycle. A separate issue is when the surface of the foodstuff, particularly out of the line of sight of the measurement device, has holes, openings or small pockets or irregularities positioned on its face 213.

Figure 4:
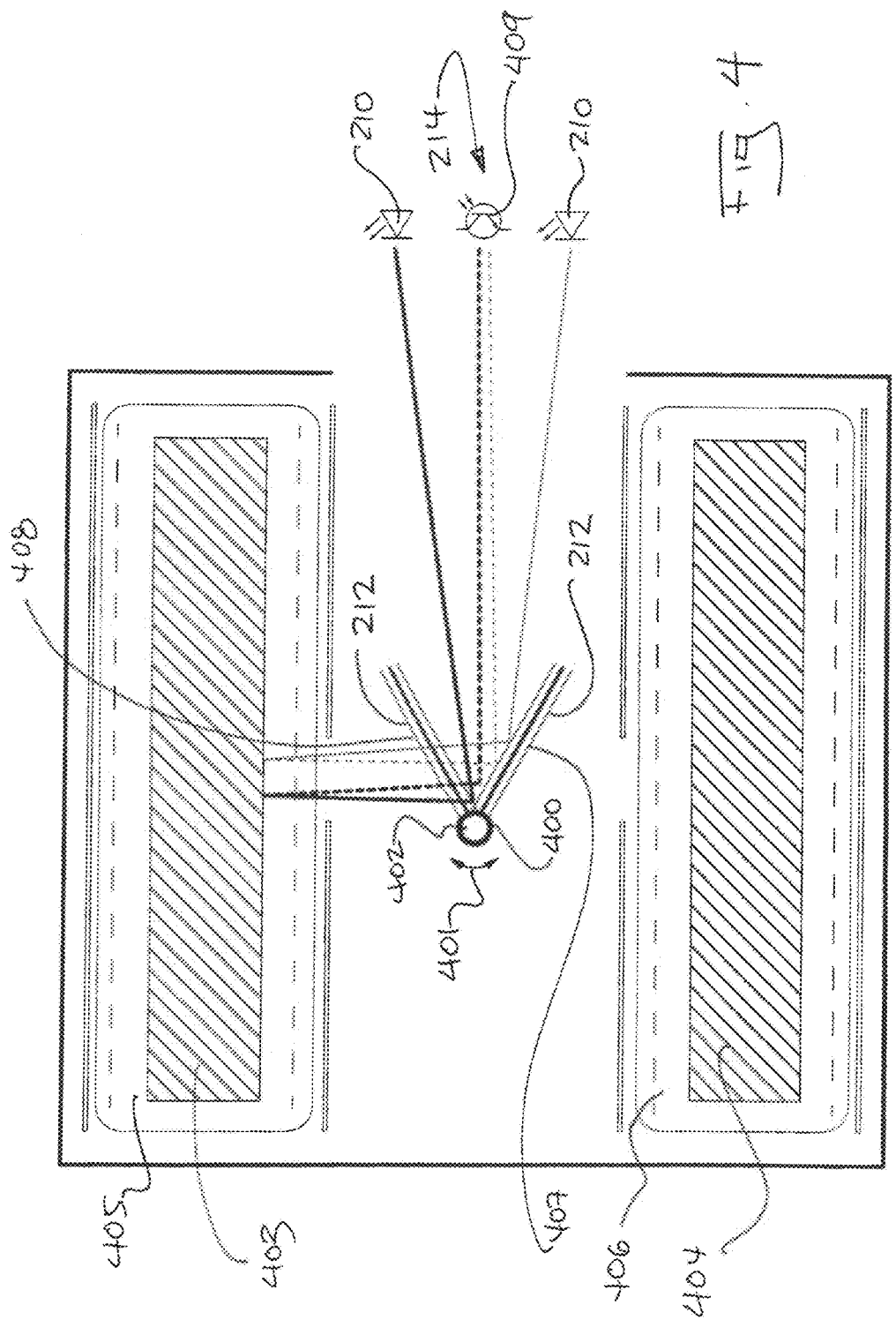
FIG. 4 is a schematic top plan view of a toaster utilising a moving mirror or reflector to make measurements from two toasting cavities.

As shown in FIG. 4 the use of an adjustable mirror mechanism 400 enables the mirror 212 to pivot or rotate, alternate or cycle by simply adjusting mirror's position or direction with respect to the measurement device 214. This direction change can be performed by adjusting the mirror's mounting location and/or mounting angle 401, thus enabling multiple sensing locations of a foodstuff and across multiple foodstuffs locations with a single fixed sensor.

The preferred component for the mechanism is an electrical motor 402, however solenoids, electromechanical devices, actuators, magnets and pulleys may be used.

By adding additional adjustable direction mirrors in an appliance assembly along with additional chromatic measurement devices, it's possible to have multi-direction (vertical and horizontal planes) detection such that instead of a partial sensing location. complete and multiple surfaces of food stuffs, e.g. bread, can be scanned for chromatic detection in real-time. This process will allow light to be propagated to and reflected back from more than one location (mirror position) thus enabling the sensing of multiple surfaces and zones over a toasting period.

The frequency at which the mechanism displaces, alternates and/or cycles is subjected but not limited to the minimum rate at which the detection of the chromatic change on all surfaces is successfully measured. Doing so, one is able to measure data from numerous locations with the use of a single chromatic measurement device. This can be seen in the diagram below (FIG. 6), the orientation of the LEDs and the sensor is assembled in the Y axis.

Figure 4A:
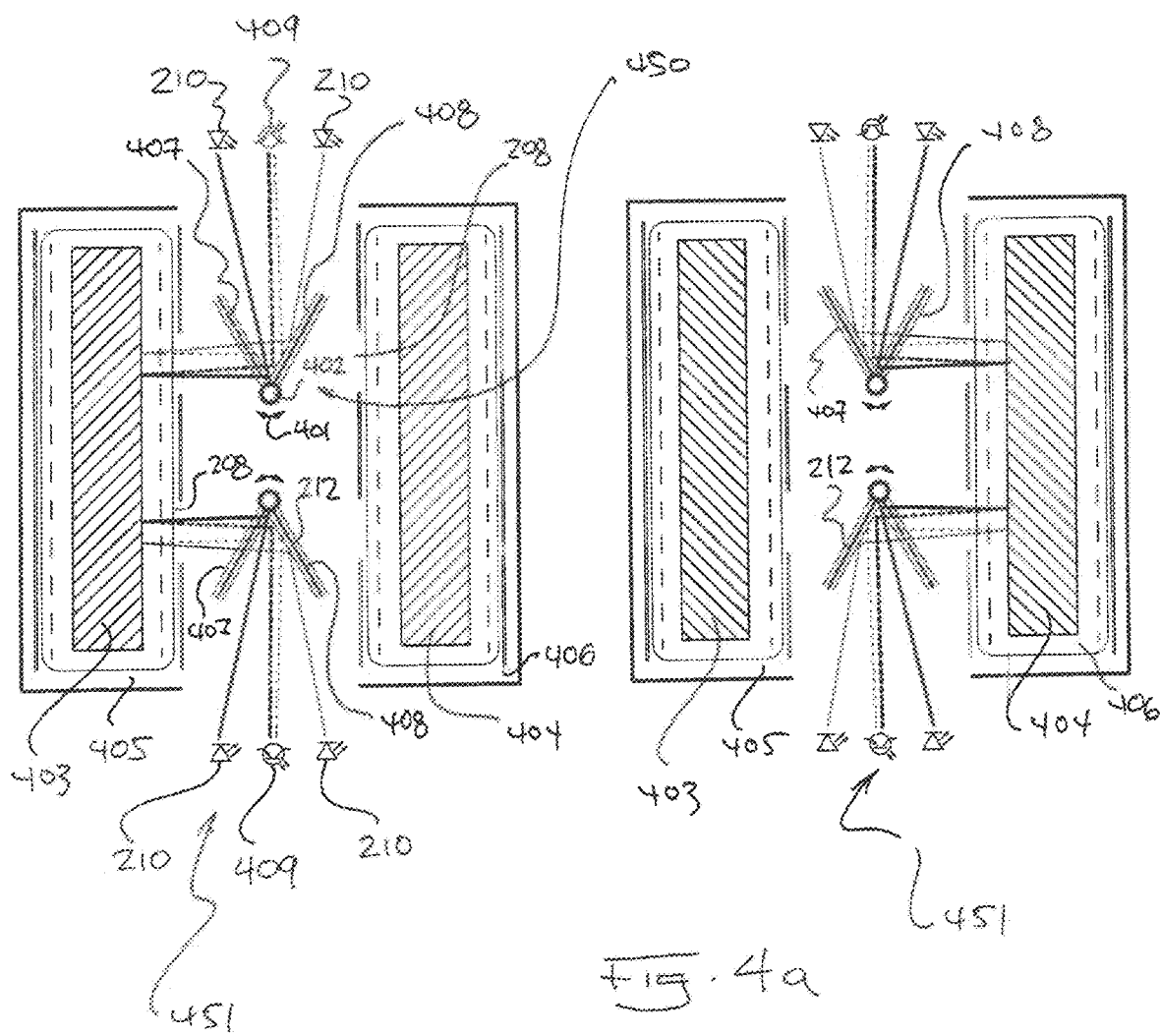
FIG. 4a is a schematic cross sectional view illustrating the use of two pivoting mirrors and two sensor assemblies in a single toaster.

FIG. 4 also illustrates that a single reflecting surface or mirror 212 may be used to sense two different food stuffs 403, 404 each located in its own toasting cavity 405, 406. In this example, a two sided mirror 212 pivots from a first position 407 to a second position 408. This pivoting motion may be accomplished with a motor 402 or otherwise as explained above. In the first position 407 light from an LED 210 is reflected onto a food 403 and from this same mirror position, reflected back to the sensor or detector 214, 409. In the other position 408 light from the sensor assembly 214 is both directed toward the second food 404 and reflected back to the sensor 409. As shown in FIG. 4a, two or more pivoting mirror assemblies 450 each with (or sharing) a sensor assembly 451 may be provided 50 as to measure food properties through two or more cavity openings 208.

Figure 4B:
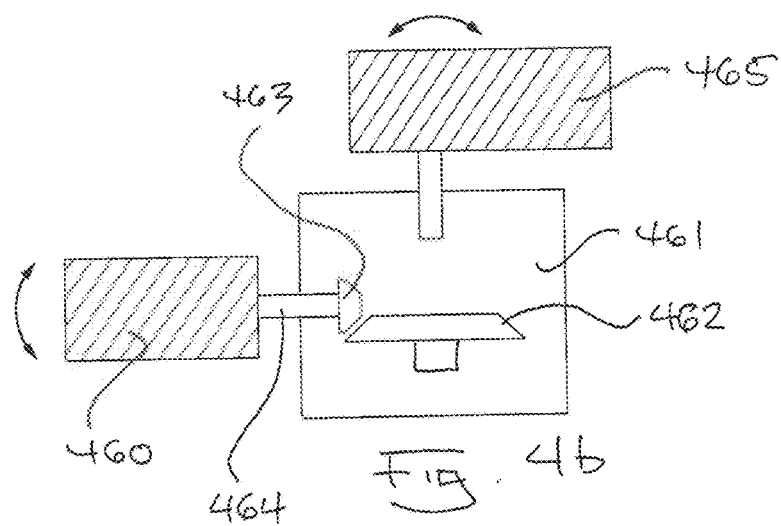
FIG. 4b is a schematic diagram of a mirror actuator assembly.
Figure 4C:
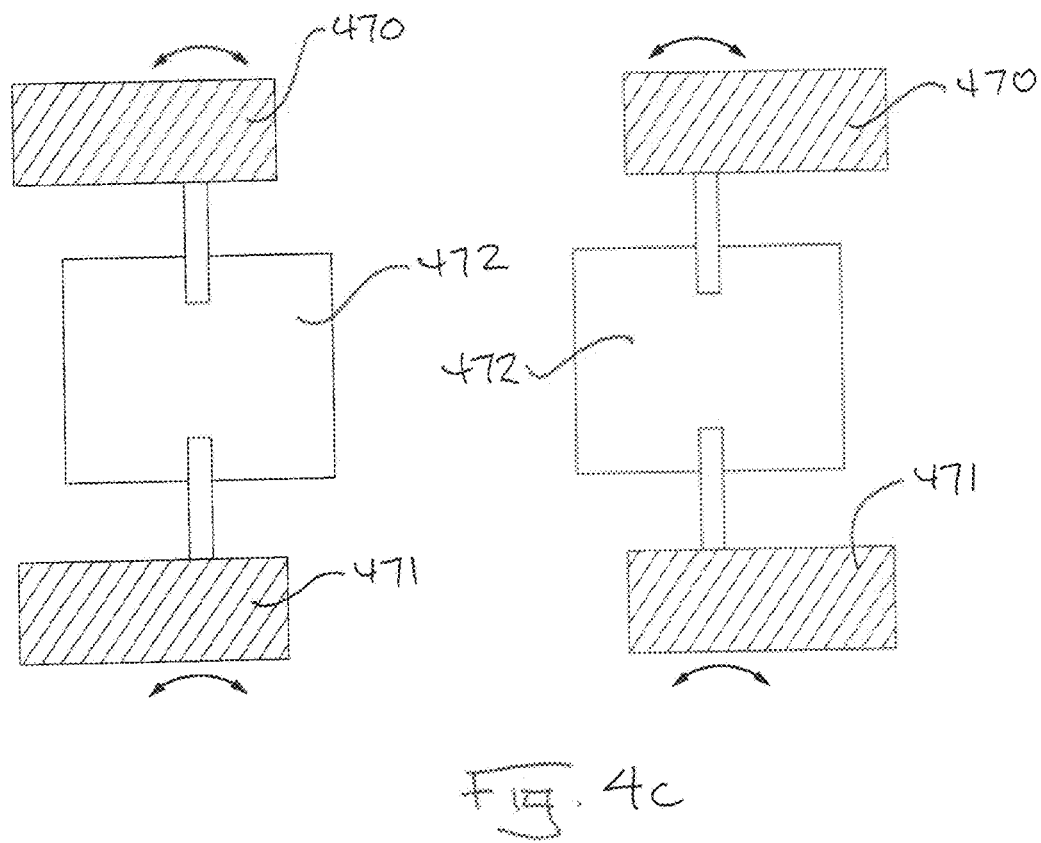
FIG. 4c is a schematic illustration depicting alternate mirror actuation assemblies.

As shown in FIG. 4b a mirror or reflector 460 may be carried by an actuator chassis 461. The chassis 461 carries a motorised bevel gear 462 that cooperates with a driven bevel gear 463. The driven bevel gear 463 rotates a shaft 464 that carries the mirror 460. In this way, the device's processor 105 can control, in this example, rotation of the mirror 460 about a horizontal axis. Rotation of the mirror 460 about the vertical axis is achieved by processor controlled actuation of a second motor 465 that rotates the chassis 461 itself. This arrangement allows the mirror 460 to be rotated about both a horizontal and a vertical axis. As shown in FIG. 4c, two separate mirrors or reflectors 470, 471 may be rotated about one or two axis of rotation by an assembly of independent or cooperating solenoids, electromechanical devices, actuators, magnets or pulleys 472.

Figure 5:
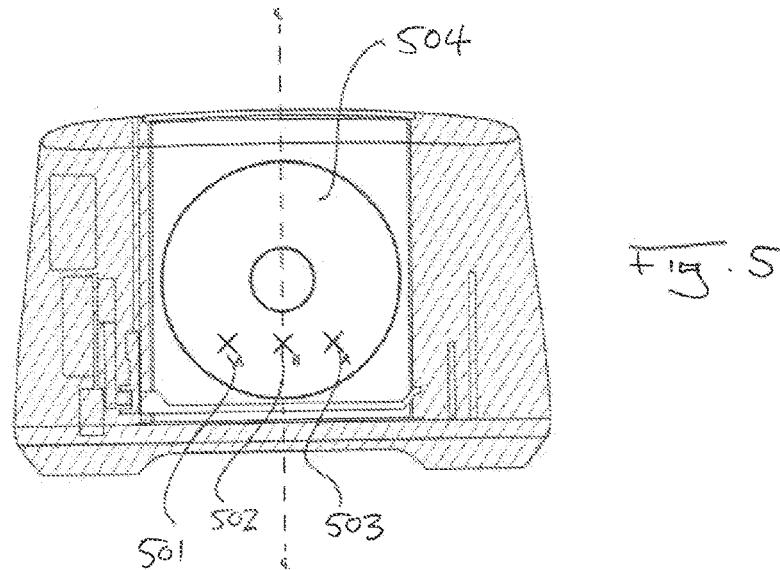
FIG. 5 is a schematic side elevation, partially sectioned illustrating a bagel and a toaster.
Figures 6, 7:
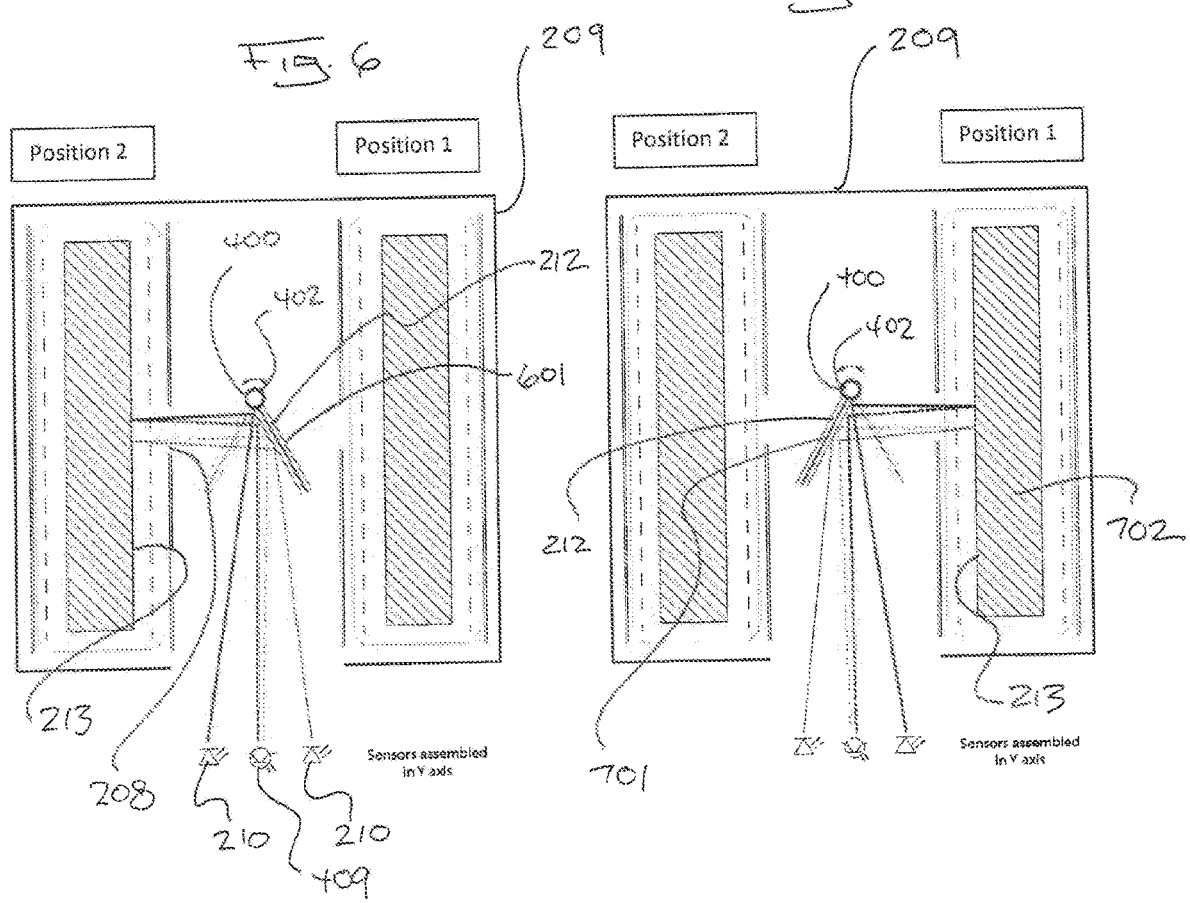
FIG. 6 is a top plan view of a toaster having a moving mirror and sensing assembly.
FIG. 7 is a top plan view of a toaster having a moving mirror and sensing assembly.

As shown in FIG. 5, it may be desirable to sense multiple locations 501, 502, 503 on a food 504 and also measure a second food in the second cavity utilising the same mirror 212 and sensing assembly 214. This can be done with a pivoting mirror as suggested by FIGS. 6 and 7. As shown in FIG. 6, in a first position 601 the mirror directs light from an LED or other emitter 210 through an opening 208 in the mica card and transmits the reflected light back to a sensor 409 that is part of the sensing assembly. Small movements of the mirror 601 in this position allow various points on the food surface 213 to be measured. A second orientation of the mirror 701 allows the same operations to be performed with respect to a second surface of a second food 702.

Figure 8:
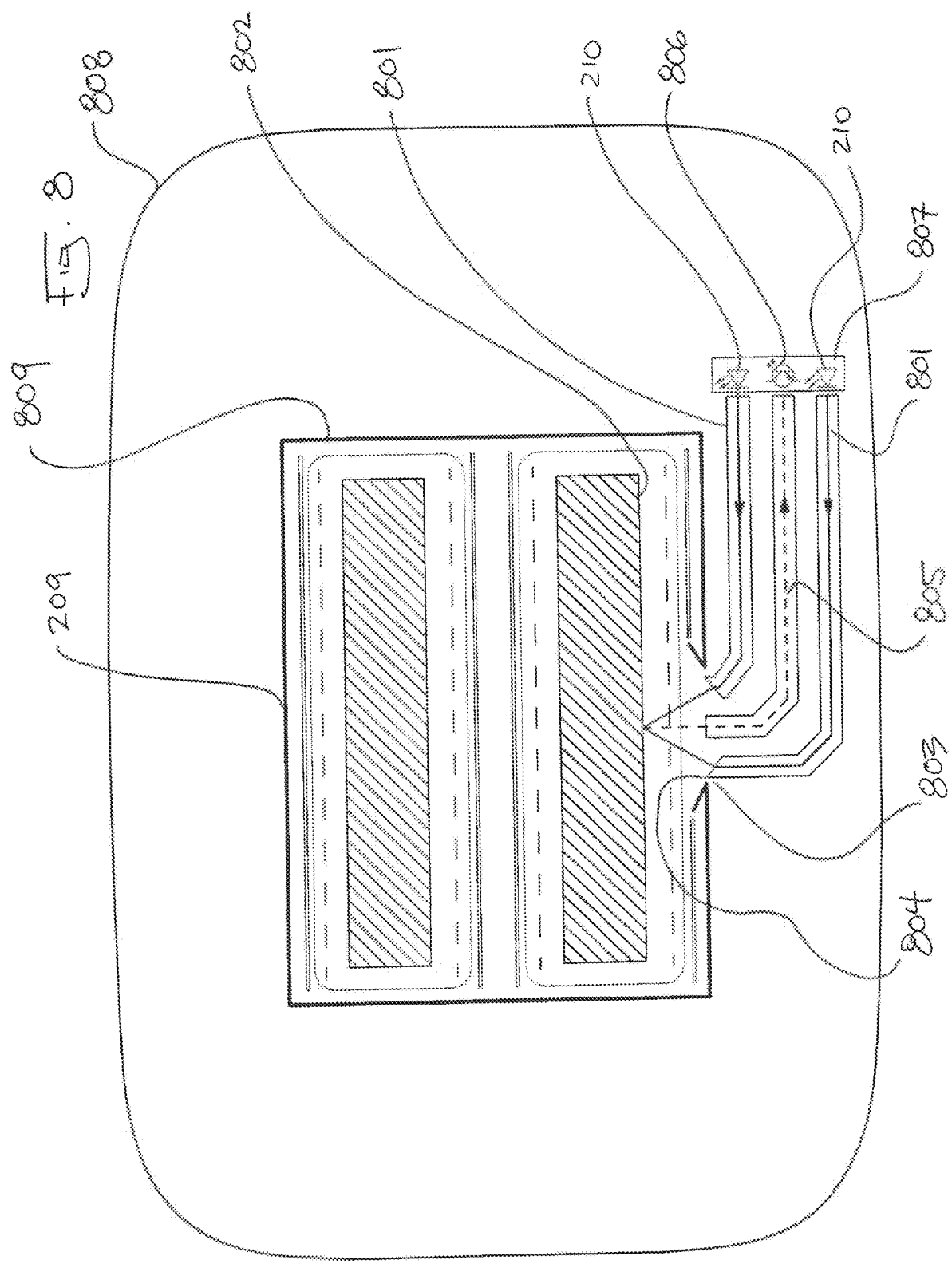
FIG. 8 is schematic top plan view of a toaster incorporating a sensor assembly and light pipes.

As shown in FIG. 8, a curved or bent light pipe, light tube or optical fibre 801 may be used to transmit an emission from an LED 210 to a surface of a food 802. In this example, the transmission light pipes 801 terminate at a location 803 that is preferably outside of the internal chassis 209 but in alignment with an opening 804 in a lateral side of the chassis.

Light from the LED or LEDs 210 is reflected by the surface 802 into a receiving light pipe, tube or fibre 805 that provides a light signal to a detector or sensor 806. In this example, the sensing assembly 807 is located between the chassis 209 and the housing 808, for example a corner area and axially beyond the end surface 809 of the chassis 209. In this way, information to and from the food can be transmitted and received accurately, circumventing internal structures. No compensation or normalisation of data is required because the sensor assembly 807 is in a cooler area of the toaster than the terminal ends 803 of the light carrying pipes, tubes or fibres.

Figure 9:
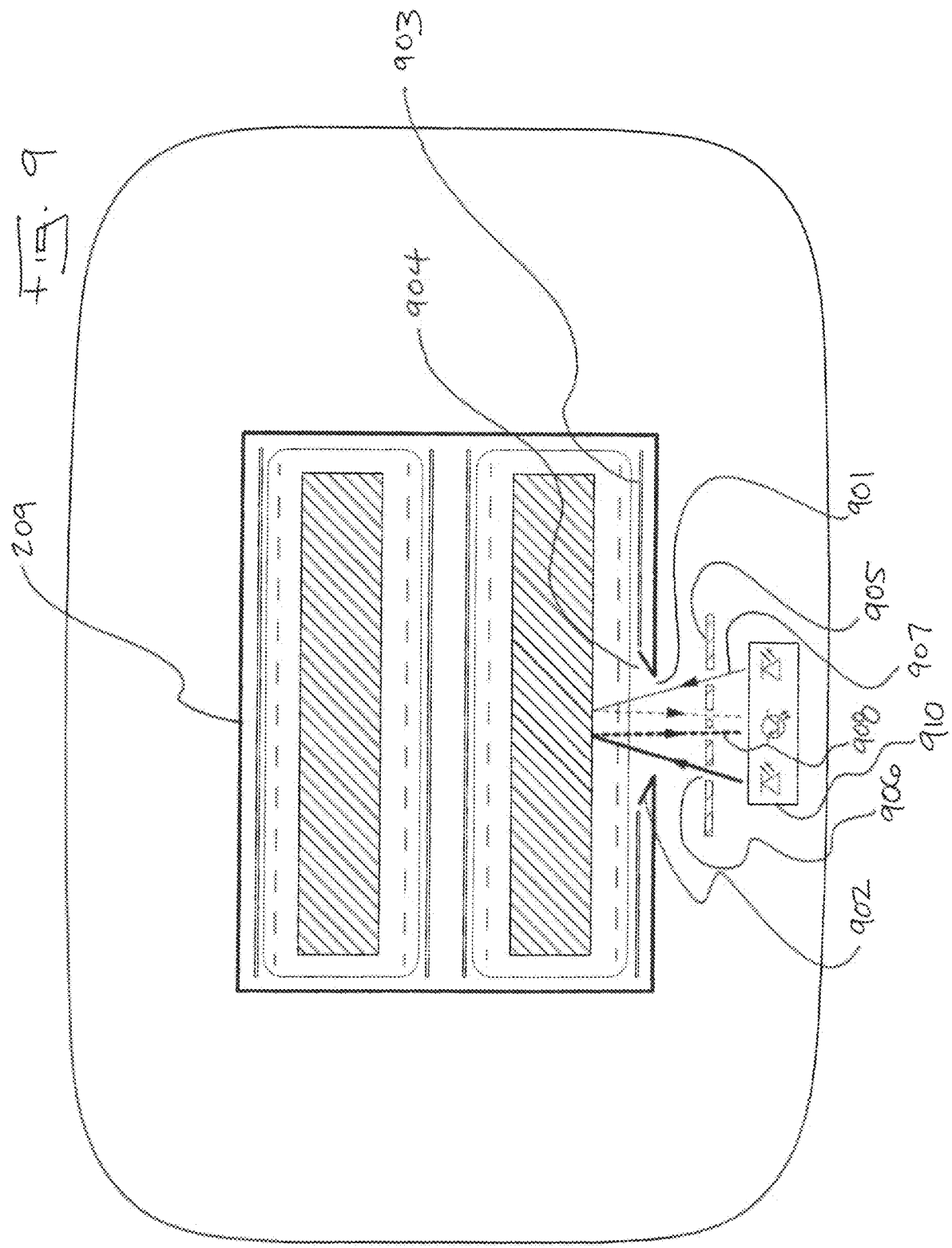
FIG. 9 is a top plan view of the toaster and sensing assembly.

As shown in FIG. 9, the through opening 901 in the lateral sidewall of the chassis 209 may be fully or partially surrounded by reflecting surfaces 902. The reflecting surfaces 902 may be formed from the same material as the chassis, often galvanised steel. Because there is an opening in the heating element card 903 and an opening 901 in the chassis 209, and because heat is transmitted through these openings, foods are more lightly toasted in the area of the openings 901, 904 than in other areas of the food being toasted. This can result not only in unevenly toasted foods but inaccurate chromatic measurements which could themselves result in burning or charring of the food. To reduce the effect of heat radiating through the openings, the reflecting surfaces 902 enable radiated heat to be reflected back from the area of the openings, ensuring more even and consistent toasting shades across the complete face of the food 912. An additional reflecting surface 905 may be positioned outside of the chassis and in alignment with the openings 901, 904. The reflecting surface 905 may be flat or curved and may be fabricated from galvanised steel. Other materials such as coated or uncoated, treated or untreated aluminium will treat a variety of treated or untreated stainless steel may be utilised. The reflecting surface 905 may have one or more through openings 901 to allow a light beam 907 emitted by the LEDs 911 and light beams 908 reflected back from the food 902 to be transmitted from and received by the sensing assembly 910. The assembly 910 includes a light sensor 916.

The chassis 209 has a side wall 913 with an aperture portion 914 providing the aperture 904. The aperture 904 exposes portion of the food product (slice of bread) 912.

A sensor device 915 includes the LEDs 911 and light sensor 916, with the device 915 located so that the reflector 905 is positioned between the device 915 and the side wall 914.

The reflector 905 has an aperture portion 916 providing the openings (apertures) 901, with the aperture portion 916 being aligned with the apertured portion 914 so that a portion of the food product 912 is exposed to the light beams 907, so that reflected light beams 908 are produced. The beams 908 are reflected back through the apertured portions 914 and 916 so as to impinge on the light sensor 916. The light sensor 916 then produces a signal indicative of a chromatic property of the food product 912. This signal can then aid in producing information indicative of the condition of the food product 912. In the case of the product 912 being a slice of bread, the signal is indicative of the degree to which the bread is toasted.

In FIGS. 10 to 13 of the accompanying drawings, there is schematically depicted a wall 10 that may be the side wall of an appliance to heat a product. The appliance may be a toaster as previously described, or an oven that performs other cooking functions including toasting, while the appliance may also be an oven to roast coffee beans.

The wall 10 at least partly encloses a chamber 13 within which a product is to be located and heated by the appliance. The wall 10 has an internal surface 16 facing toward the chamber 13, and an external surface 11. Attached to the surface 11 is at least one sensor assembly 12. In this embodiment there are two, spaced, assemblies 12. This is to enable accurate detection of the chromatic properties of a piece of toast in case the toast has a raisin in it. Having at least two sensor assemblies 12 provides detection redundancy. Each sensor assembly 12 is adapted to detect a chromatic property of a product located in the chamber 13, as the product is heated. In particular, the sensor assembly 12 is adapted to detect a colour change in the product as a result of the product being heated (toasted, roasted, cook).

In the case of a toaster, the appliance (toaster) would include a heating element 14 that may be a card with an electrically heated wire wound on the card. Mounted internally relative to the element 14 is a micra sheet 15 that protects the element 14 from foreign bodies, for example bread crumbs or the user accidentally touching the heating elements thus causing a short circuit.

The internal reflective surface 16 reflects radiant heat generated by the element 14 back towards the chamber 13. Accordingly, the wall 10 acts as a heat shield.

The wall 10 is provided with an apertured portion 17 for each assembly 12, that each includes an aperture 18 that is aligned with respective apertures 19 in the element 14 and preferably further respective apertures 20 in the element 14, so that the food product located in the chamber 13 is exposed to the apertures 18. The apertures 18 may also be a portion that provides for the passage of light through the wall 10.

Preferably, the wall 10 is formed of sheet metal, with each aperture 18 formed by cutting the wall 10 and bending portions 21. The portions 21 act as reflectors that aid in redirecting radiant energy at portions of the product aligned with the apertures 20. Located between the wall 10 and the element 14 is a heat shield 23 that aids in reflecting and inhibiting the transfer of heat to the wall 10. The heat shield 23 has an apertured portions 24 provide apertures 25 aligned with respective apertures 18, 19 and 20. The shield 23 has reflective portions 50 that aid in directing heat at those portions of the product that are aligned with the aperture 25.

Preferably, the heat shield 23 has projections 26 that engage the element 14 to space the element 14 from the heat shield 23.

Preferably, the wall 10 has projections 22 that abut the heat shield 23 to aid in spacing the wall 10 from the heat shield 23, and to provide channels between the wall 10 and heat shield 23 for the passage of air therethrough.

The following description is in respect of one of the assemblies 12.

Abutting the surface 11 and surrounding the apertures 18 is a heat shield 27 that has an aperture 28 aligned with the apertures 18, 25, 19 and 20. Abutting the heat shield 27 is a heat insulator 29.

A further heat shield 31 having apertures 32 is located adjacent the heat insulator 29, located between the shields 29 and 31. The insulator 29 has apertures 30.

Adjacent the heat shield 31 is a further insulator 33 having an aperture 34 aligned with the aperture 32 and other apertures 28 and 30.

Adjacent the heat insulator 33 is a heat sink 35 having an aperture 36 aligned with the aperture 34.

Mounted adjacent the heat sink 35 is a cable management bracket 37 upon which there is mounted a sensor device 38. The device 38 includes a printed circuit board 32 upon which there is mounted an LED (preferably green light emitting) 43, and NTC (Thyristor) sensor 40 and an optical sensor 41 together with an infrared sensor 44. The sensors 40, 41 and 44, and LED 43 are aligned with the apertures 18, 25, 19, 20, 36 and 34, so that light emitted by the LED 43 impinges on the food product being heated, with a reflected beam then returning to the sensors 40, 41 and 44. The sensors 40, 41 and 44 then providing a signal indicative of a chromatic characteristic of the food product.

The wall 10, and shields 23, 27, and 31 are reflectors to aid in reflecting heat away from the sensor device 38, while the insulators 29 and 33 aid in limiting the transfer of heat by conduction between the shields 27, 31, and the shield 31 and heat sink 35.

The bracket 40 has apertures 47 that provide for the passage of the source beam and reflector beam with respect to the sensor device 12, and the product being heated.

The shield 31 has projections 49 that engage the shield 27 so as to provide passages 49 to prevent heat from leaking into the assembly as a whole (for example between the heat shields 31 and 27).

In the above described embodiment, the heat sink 35 is held by the bracket 37, so as to be firmly connected to the NTC sensor 43 to at least aid in stabilising the temperature of the sensor 43.

The insulators 29 and 33 are attached to the heat sink 35, and hold the heat shield 31.

In the above embodiments, the apertures may be replaced with material that light can pass through.

The advantage of the above described preferred embodiment is that the LED 43, sensor 41 and sensor 44 are optically exposed directly to the product being cooked, via the aligned opening, while being subjected to lower temperatures relative to the chamber 13, while also providing a stable temperature for the device 38.

In the embodiment of FIG. 15, the sensor assembly 12 is incorporated in an oven 45, in particular mounted on the wall 10 thereof. Preferably the wall 10 is an upper wall of the oven 45. The sensor is oriented in this embodiment facing downward so as to provide an indication of a chromatic property of the product being cooked in the bowl 46 of the oven 45.

Although the invention has been described with reference to specific examples, it will be appreciated by those skilled in the art that the invention may be embodied in many other forms.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may.

Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Unless specifically stated otherwise, as apparent from the following discussions, it is appreciated that throughout the specification discussions utilizing terms such as "processing," "computing," "calculating," "determining" or the like, refer to the action and/or processes of a microprocessor, controller or computing system, or similar electronic computing or signal processing device, that manipulates and/or transforms data.

Furthermore, while some embodiments described herein include some but not other features included in other embodiments, combinations of features of different embodiments are meant to be within the scope of the invention, and form different embodiments, as would be understood by those in the art.

Thus, while there has been described what are believed to be the preferred embodiments of the invention, those skilled in the art will recognize that other and further modifications may be made thereto without departing from the scope of the invention, and it is intended to claim all such changes and modifications as fall within the scope of the invention.

The invention claimed is:

1. A sensor assembly for installation in an appliance to detect a chromatic property of a product that is to be heated in the appliance, the appliance having a chamber to receive the product, the chamber having a wall with an apertured portion through which the product can be exposed, the assembly comprising:

a reflector having a reflector surface, the reflector having a wall portion through which light can pass, to be aligned with the wall apertured portion; and a sensor device fixed with respect to the reflector so that the reflector is to be positioned between the wall and the sensor device, the sensor device including a light source to produce a source light beam directed at the wall portion so as to illuminate a portion of the product so as to produce a reflected beam, a light sensor fixed with respect to the light source and aligned with the wall portion so as to receive the reflected beam and provide a signal indicative of a property of the reflected beam and therefore the chromatic property of the product.

2. The sensor assembly of claim 1, wherein the reflector is located so that the wall is located between the reflector and the light sensor.

3. The sensor assembly of claim 2, wherein the reflector is a first reflector and the assembly includes a second reflector, the second reflector being located between the wall and the sensor device.

4. The sensor assembly of claim 1, wherein the sensor assembly includes a heat sink located between the wall and the sensor device, the heat sink providing for passage of the source light beam and the reflected beam.

5. The sensor assembly of claim 4, wherein the reflector is a first reflector and the assembly includes a second reflector, the second reflector being located between the wall and the sensor device, and wherein a heat insulator is located between the second reflector and the heat sink.

6. The sensor assembly of claim 5, wherein a heat shield is located between the heat insulator and the heat sink.

7. The sensor assembly of claim 6, wherein the heat shield includes projections that provide passages through which air passes to cool the sensor assembly.

8. The sensor assembly of claim 4, wherein the heat sink is firmly connected to a portion of the sensor device to aid in stabilising the temperature of at least a portion of the sensor device.

9. The sensor assembly of claim 1, wherein the wall portion is at least one aperture.

10. The sensor assembly of claim 1, wherein the wall includes reflectors that aid in reflecting radiant energy back towards portions of the product aligned with the apertures.

11. The sensor assembly of claim 10, in combination with a toaster, and wherein the sensor assembly is housed within the toaster.

12. The sensor assembly of claim 11, wherein the wall is vertically oriented.

13. An appliance to receive a product or heat the product, the appliance comprising:

a chamber to receive the product;

a heater to heat the chamber and therefore the product contained therein;

at least one side wall at least partly defining the chamber, the side wall having a wall portion through which light can pass;

a sensor device fixed with respect to the side wall, the sensor device including a light source to produce a source light beam to illuminate a portion of the product so as to produce a reflected beam, a light sensor fixed with respect to the light source and positioned so as to receive the reflected beam and provide a signal indicative of a property of the reflected beam and therefore the chromatic property of the product; and a reflector to intercept the source beam and reflected beam so that the source beam is directed at the product, and the reflected beam is directed at the light sensor.

14. The appliance of claim 13, wherein the wall portion is an aperture.

15. The appliance of claim 13, wherein the reflector is movable so that the light source engages a further portion of the product.

16. The appliance of claim 13, further including a lens that intercepts the source beam and the reflected beam.

* * * * *